United States Patent [19]

Claussen et al.

[11] Patent Number: 4,985,124
[45] Date of Patent: Jan. 15, 1991

[54] ELECTRICALLY CONDUCTING POLYHETEROAROMATICS AND A PROCESS FOR THEIR PREPARATION

[75] Inventors: Uwe Claussen, Leverkusen; Udo Herrmann, Dormagen, both of Fed. Rep. of Germany

[73] Assignee: Bayer Aktiengesellschaft, Leverkusen, Fed. Rep. of Germany

[21] Appl. No.: 331,472

[22] Filed: Mar. 31, 1989

[30] Foreign Application Priority Data

Apr. 21, 1988 [DE] Fed. Rep. of Germany ....... 3813362

[51] Int. Cl.$^5$ .............................................. C25B 3/00
[52] U.S. Cl. ......................................... 204/72; 204/78
[58] Field of Search .......................... 204/78, 72, 59 R

[56] References Cited

U.S. PATENT DOCUMENTS 4,536,262  8/1985  Wegner et al. ...................... 204/78
4,547,270 10/1985  Naarmann ............................. 204/72
4,569,734  2/1986  Naarmann et al. ................... 204/78

OTHER PUBLICATIONS

Chemical Abstract 107:26112r, p. 169.
Chemial Abstract 103:88486s, p. 21.

Primary Examiner—John F. Niebling
Assistant Examiner—Steven P. Marquis
Attorney, Agent, or Firm—Sprung, Horn, Kramer & Woods

[57] ABSTRACT

The invention relates to a process for the preparation of electrically conducting polyheteroaromatics by electrochemical oxidation of monomers of heteroaromatic compounds in electrolyte systems containing water, surfactants and/or co-surfactants with deposition of the polyheteroaromatics on the surface of the anode, characterized in that the electrolyte system is a microemulsion consisting of monomeric compound, water, surfactant and co-surfactant.

5 Claims, No Drawings

ELECTRICALLY CONDUCTING POLYHETEROAROMATICS AND A PROCESS FOR THEIR PREPARATION

The invention relates to a novel process for the preparation of electrically conducting polyheteroaromatics by electrochemical oxidation of oxidatively polymerizable monomeric heteroaromatic compounds and the polyheteroaromatics obtained by this process.

It is already known to oxidize oxidatively polymerizable monomeric heteroaromatic compounds such as pyrrole electrochemically to electrically conducting polyheteroaromatics, for example to polypyrrole (see, for example, J.C.S. Chem. Comm. 1979, pages 635 and 854 or DE-OS (German Published Specification) 3,049,551).

Furthermore is it known that the quality, for example the nature of the surface, and the physical properties, in particular the conductivity but also the mechanical stability, of the polymers obtained by electrochemical oxidation is highly dependent on the conditions used in the oxidation (see, for example, J. Electrochem. Soc. 134 (1) 101–105 (1987)). Therefore a wide range of conditions for the electrochemical oxidation have been investigated and described.

The following systems have thus been proposed for the oxidation:

(a) Solutions of the monomeric heteroaromatic compounds in organic solvents containing conducting salts (see, for example, EP-A 0,055,358 and the publications cited therein);

(b) Solutions of the monomers in water-containing organic solvents containing conducting salts (see, for example, U.S. patent specification 3,574,072);

(c) Aqueous solutions of the monomers containing conducting salts and surfactants (see J. Electrochem. Soc. loc. cit.; Macromol. Chem. Rapid Comm. 5, 157–164 (1984); Mol. Cryst. Liqu. Cryst 1985, Vol. 118, 193–197; Jap. J. Appl. Phys. Part 2, (1985), 24 (6) 423–424 (abstracted in CA 103, 88 486s); FR-A 2,556,137);

(d) Aqueous dispersions of the monomers containing conducting salts and surfactants and, if desired, watermiscible organic solvents (see EP-A 0,129,070); and (e) Aqueous dispersions containing conducting salts, surfactants, water-miscible organic solvents and aliphatic hydrocarbons (see Japanese patent application 87/93,863 (abstracted in CA 107, 26 112r)).

It is true that by means of these known systems polyheteroaromatic films, in particular polypyrrole films, are obtainable which have a good quality and good physical properties; the films are smooth, flexible, chemically resistant and electric conductivities of 1 to more than 400 S/cm are given for them. However, repeating the processes has shown that electric conductivities of >30 S/cm are not reproducible (see Macromol. Chem. Rapid Commun., loc. cit., page 158) but that in the final analysis it is only possible to obtain polyheteroaromatic films whose conductivity is ≦30 S/cm. In addition, all the films have a storage capacity/kg of film which is too small for practical application.

Surprisingly, it has been found that electrochemical oxidation of monomeric heteroaromatic compounds in systems containing water, surfactants and water-miscible organic solvents (co-surfactants) polyaromatic films having substantially improved properties are obtained—their electrical conductivity is reliably reproducible and is at least 100 S/cm and their storage capacity is 30% higher than the hitherto achieved storage capacities—if the amounts of monomer, water, surfactant and co-surfactant are adjusted with respect to another in such a manner that the components form a microemulsion.

As is known, microemulsions are special systems whose properties are substantially different from those of solutions, on the one hand, and those of ordinary emulsions (macroemulsions, dispersions), on the other. In contrast to the ordinary emulsions, microemulsions are optically clear liquids, but are nevertheless, in contrast to solutions, two-phase systems. The special properties of microemulsions and explained by the presence of the emulsified particles in extremely finely divided form (see the statements about microemulsions in U.S. patent specification 4,371,447, column 1).

According to the invention, it has been found that the properties of the polymer films obtained in the electrochemical oxidation of heteroaromatic monomeric compounds improve considerably if the heteroaromatic monomers are not present as in the past in dissolved or dispersed form but in microemulsified form.

The invention accordingly relates to a process for the preparation of electrically conducting polyheteroaromatics by electrochemical oxidation of monomeric heteroaromatic compounds in electrolyte systems containing water, surfactants and/or co-surfactants with deposition of the polyheteroaromatics on the surface of the anode, which is characterized in that the electrolyte system is a microemulsion consisting of monomeric compound, water, surfactant and co-surfactant.

The microemulsions to be used according to the invention for the electrochemical oxidation are obtained by mixing the monomeric heteroaromatic compound only with such an amount of water which is insufficient for dissolving the monomer and adding to the dispersion thus obtained such an amount of the surfactant/co-surfactant mixture that the resulting liquid just turns clear. This clear liquid which is not a solution but a two-phase system which merely appears to be optically homogeneous represents the microemulsion to be used for the electrochemical oxidation.

The microemulsions are separated from the dispersions by the binodal. In the phase diagram water/heteroaromatic monomer/surfactant/co-surfactant mixture, the binodal separates the two-phase region of the water/heteroaromatic monomer dispersions from the optically singlephase region of the microemulsions consisting of heteroaromatic monomer/water/surfactant/co-surfactant mixtures. This binodal can be determined for each water/monomer/surfactant/co-surfactant system by clearpoint titration in which the amount of surfactant/co-surfactant mixture required to convert the optically cloudy water/monomer dispersions into the optically clear water/monomer/surfactant/co-surfactant mixture microemulsions is determined by titration for the various water/monomer mixtures (for example 1:9, 2:8, 3:7 . . . , 9:1 mixtures).

Preferably, water, monomer and surfactant/cosurfactant mixture are used in relative amounts which are close to the binodal, that is, only a slight excess, up to 20% by weight, beyond the amount of surfactant/co-surfactant mixture which is necessary for reaching the clearpoint is used.

The water content of the microemulsions to be used according to the invention is preferably in the range from 40 to 80% by weight, particular preferably in the range from 40 to 78% by weight, relative to the total weight of the microemulsions.

According to the prior art, the amounts of water or water/organic solvent mixture and monomer have hitherto been chosen in such a manner that the monomer either completely dissolves in the water or the water/solvent mixture —the addition of a surfactant to these solutions does not change anything with respect to the single-phase state of the solution—or instead the monomer was dispersed in such an amount of water or water/solvent mixture which is insufficient in terms of its solubility and only such an amount of surfactant was added to this dispersion as is necessary for stabilizing the dispersion, that is, to maintain an optically inhomogeneous phase, and not—as according to the invention—such an amount of surfactant which results in a clear liquid, the microemulsion.

By means of the microemulsions to be used according to the invention, polypyrrole films whose radical cations consist of only two pyrrole units $[2 \text{ pyrrole}]\cdot\oplus$ are obtainable for the first time. Polypyrrole films whose radical cations contain only two pyrrole units are novel. The invention accordingly also relates to polypyrrole films consisting of radical cations of the formula $[2 \text{ pyrrole}]\cdot\oplus$ and anions $A\ominus$)

Carrying out the electrochemical oxidation with microemulsions of the monomeric heteroaromatic compounds has, however, not only the advantage of producing a qualitatively substantially improved polymer film but also the advantage that much higher monomer concentrations can be used. While in the examples of EP-A 0,129,070 the reaction is only carried out with dispersions containing 2% by weight of monomer (pyrrole) per 100 g of water or 105 g of electrolyte solution, the microemulsions to be used according to the invention can easily contain 25 g of monomer (for example pyrrole) in 100 g of water or 150 g of aqueous surfactant solution.

The oxidatively polymerizable monomeric heteroaromatic compounds which are used in the process according to the invention are in particular heteroaromatic compounds having 5— or 6-membered ring systems. These monomeric heteroaromatic compounds preferably contain 1 to 3 hetero atoms, in particular N, O and/or S atoms, in the ring system and can be substituted on the ring carbon atoms, for example by alkyl groups, in particular those having 1 to 6 carbon atoms, preferably at least two ring carbon atoms being unsubstituted in order to make it possible to carry out the anodic oxidation in a simple and efficient manner. Examples of heteroaromatic compounds of this type are: furan, thiophene, thiazole, oxazole, thiadiazole, imidazole, pyridine, 3,5-dimethylpyridine, pyrazine and 3,5-dimethylpyrazine. Preferably, pyrroles are used in the process according to the invention, in particular unsubstituted pyrrole but also pyrroles substituted by alkyl groups and halogen atoms such as 3,4-dialkylpyrroles, for example 3,4-dimethylpyrrole and 3,4-diethylpyrrole and also 3,4-dihalogenopyrroles, in particular 3,4-dichloropyrrole.

To prepare the microemulsions to be used according to the invention, preferably anionic surfactants such as the alkali metal salts, for example the lithium salts, sodium salts or potassium salts of alkylsulphonates (in particular of $C_8$–$C_{18}$-alkylsulphonates), alkylarylsulphonates (in particular those having 10 to 30 carbon atoms), alkyl sulphates (in particular those of $C_8$–$C_{14}$-alkyl sulphates) are used. By using these anion-active surfactants, the addition of conductive salts to the microemulsions is unnecessary.

Co-surfactants are compounds which themselves need not have a surface-active action but act as solubilizers in the presence of surfactants. Preferably, the co-surfactants used in the process according to the invention are watermiscible organic compounds, in particular ethers, polyethers, alcohols, in particular polyhydric alcohols such as glycols, polyethylene oxide derivatives. The amount of cosurfactant depends on the properties of the monomeric heteroaromatic compound. In general, 8 to 80% by weight of cosurfactant, preferably 15 to 35% by weight, relative to the weight of the surfactant/co-surfactant mixture are required.

The process according to the invention can be carried out in customary electrolytic cells or electrolysis apparatuses known per se. Examples of highly suitable apparatuses are simple electrolysis apparatuses consisting of a cell without diaphragm, two electrodes and an external current source. The electrodes can be made, for example, of graphite or a conventional inert electrode material, in particular a noble metal such as gold, platinum or palladium, stainless steel, nickel or titanium. Since during the electrochemical polymerization the monomeric heteroaromatic compounds are oxidized at the anode and the polymers formed are deposited on the anode, to prepare films from the polyheteroaromatics at least the anode but in particular both electrodes, are designed in the form of sheets. The size of the anode surface in this process corresponds to the size of the resulting polymer film. Preferably, the areas of the two electrodes are arranged parallel to one another.

In addition to the simple electrolytic cell without diaphragm, it is also possible to use other electrolysis means for the process according to the invention, for example cells with diaphragms or those with reference electrodes for the exact determination of the potential. Frequently, measurement of the current (A sec) is advantageous, since thereby inter alia the layer thickness of the deposited films can be controlled.

Normally the process according to the invention is carried out at room temperature. However, since the reaction temperature has proven not to be critical for the polymerization of the heteroaromatic compounds, the temperature can be varied in a wide range as long as it does not fall below or exceed the solidification temperature or boiling temperature, respectively, of the electrolyte solvent. In general, a polymerization temperature in the range from 0° to 50° C., in particular from $+10°$ to $+30°$ C., has proven to be very advantageous.

Any direct current supply such as, for example, a battery which supplies a sufficiently high electric voltage, is suitable as the current source for the operation of the electrolytic cell in which the process according to the invention is carried out. Usually the electrochemical polymerization according to the invention is operated at a voltage in the range from 1 to 10 volt, preferably in the range from 1.5 to 4 volt. The magnitude of the voltage chosen also depends inter alia from the distance of the electrodes and increases with increasing distance. Values in the range from 0.05 to 50 mA/cm², preferably in the range from 0.1 to 5 mA/cm², have proven to be favourable and adVantageous for the current density in the process according to the invention.

The duration of the electrolysis depends inter alia from the electrolyte system used, the particular electrolysis conditions and in particular also on the desired film thickness. Usually the electrolysis time is in the range of a few minutes or several hours. Thus, for example, films of a few μm in thickness, for example from 5 to 10 μm in thickness, can easily be obtained within a quarter of an hour so that, for example, over a period of 2 to 12 hours films of a thickness in the range from 10 to 100 μm can be prepared.

The film-like polyheteroaromatics deposited on the anode during electrolysis are washed with solvents, preferably water or aqueous solvents, to remove any adhering conductive salt and/or emulsifier and dried at temperatures in the range from 25° to 150° C., preferably in vacuo. If graphite, noble metal, steel, titanium, nickel or similar electrodes are used, the polyheteroaromatic films can subsequently in general easily be removed from the electrode, in particular if layer thicknesses of more than 5 μm were deposited. The films thus obtained are selfsupportive, stable, have good mechanical properties and stabilities and a well developed cohesive surface.

The polyheteroaromatic films obtainable according to the invention differ from the polymer films obtained according to the prior art in that in them the ratio of monomeric units/anions is no longer 3:1 but 2:1 and that they do not contain any organic solvent trapped inside. As a result of the smaller ratio of monomeric units/anions, the polymer films obtainable according to the invention have a significantly higher charge density than the polymer films obtainable according to the prior art.

The polyheteroaromatics prepared according to the invention have very good properties in terms of practical application and can be used in all areas in which the previous polyheteroaromatics have also found application. This includes, for example, the use for the preparation of catalysts, electric switches, semiconductor components, electrodes, screening materials and also for antistatic finishing of plastics.

EXAMPLE 1

12.3 g of pyrrole were mixed with 50 g of water. 34.7 g of a 1:1.6 mixture of sodium dodecyl sulphate and ethylene glycol were added to the dispersion. After addition of the mixture, the cloudy dispersion had been converted into a clear liquid. The clear liquid (microemulsion) was electrolysed in an electrolytic cell. The anode consisted of a polycarbonate film (actual size: 20×40 mm) treated with gold vapour. After an electrolysis time of 0.1 h (anode current density: 30 mA/cm$^2$, cell voltage: 3.5 V), a black, smooth film of polypyrrole, 5 μm in thickness, had been deposited on the anode. Its electric conductivity was 140 S/cm.

According to elemental analysis (combustion analysis) of the PP film, 1 dodecyl sulphate ion is present per 2 pyrrole units, that is, it consists of $[2\ Py]^{\oplus} (C_{12}H_{25}OSO_3)^{\ominus}$.

Equivalent polypyrrole films were obtained with microemulsions consisting of the following components:

(a) 12.3 g of pyrrole, 100 g of water, 34.7 g of a 1:1.6 mixture of sodium dodecyl sulphate and ethylene glycol;

(b) 12.3 g of pyrrole, 150 g of water, 34.7 g of a 1:1.6 mixture of sodium dodecyl sulphate and ethylene glycol;

(c) 16.3 g of pyrrole, 50 g of water, 34.7 g of a 1:1.6 mixture of sodium dodecyl sulphate and ethylene glycol;

(d) 12.3 g of pyrrole, 100 g of water, 32 g of a 1:2.04 mixture of sodium octyl sulphate and ethylene glycol;

(e) 12.3 g of pyrrole, 100 g of water, 33.4 g of a 1:1.8 mixture of sodium decyl sulphate and ethylene glycol;

(f) 12.3 g of pyrrole, 50 g of water, 34.7 g of a 1:1.6 mixture of sodium dodecylsulphonate and ethylene glycol.

What is claimed is:

1. In a process for the preparation of an electrically conducting polyheteroaromatic by electrochemically oxidizing the monomeric heteroaromatic compound in an electrolyte cell comprising an anode, a cathode and a liquid electrolyte system which electrolyte system contains the monomeric heteroaromatic compound, water, a surfactant, a co-surfactant or a mixture of a surfactant and a co-surfactant with depositing of the polyheteroaromatic on the surface of the anode, the improvement which comprises using as the electrolyte system a microemulsion which is formed by the monomeric compound, the water, the surfactant and the co-surfactant.

2. The process of claim 1 wherein the surfactant is an anionic surfactant.

3. The process of claim 1 wherein the water content of the microemulsion is in the range from 40 to 80% by weight, relative to the total weight of the microemulsion.

4. The process of claim 1 wherein the co-surfactant content in the surfactant/co-surfactant mixture is 8 to 80% by weight, relative to the weight of the surfactant-/co-surfactant mixture.

5. The process of claim 1 wherein the monomeric compound is pyrrole.

* * * * *